United States Patent Office 3,780,060
Patented Dec. 18, 1973

3,780,060
BENZOFURO[2,3-c]PYRROLES
Sylvester Klutchko, Hackettstown, John Shavel, Jr., Mendham, and Maximilian von Strandtmann, Rockaway, N.J., assignors to Warner-Lambert Company, Morris Plains, N.J.
No Drawing. Filed Aug. 19, 1971, Ser. No. 173,330
Int. Cl. C07d 27/30, 27/36
U.S. Cl. 260—326.5 B               6 Claims ABSTRACT OF THE DISCLOSURE
Compounds of the following formula are disclosed:

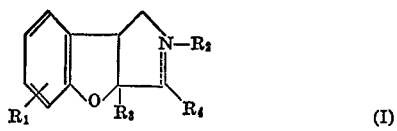

wherein
$R_1$ = hydrogen, hydroxy, acyloxy, (1–6c) alkoxy, alkyl or halogen.
$R_2$ = hydrogen, alkyl, substituted alkyl or aralkyl, acyl or non-existant or $CH_3^+I^-$ (when double bond is between the positions indicated).
$R_3$ and $R_4$ = alkyl.

These compounds are useful as skeletal muscle relaxants or as a mild tranquilizer.

---

The present invention is concerned with certain pyrrole derivatives having the following structural formula:

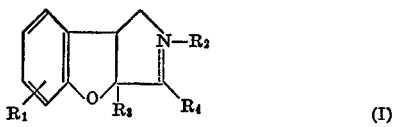

wherein $R_1$ is hydrogen, hydroxy, acyloxy, alkoxy, alkyl or halogen. $R_2$ is hydrogen, lower alkyl, substituted alkyl, substituted aralkyl, acyl, or non-existant or $CH_3^+I^-$ (when double bond is between the positions indicated as in the formula above) and $R_3$ and $R_4$ are alkyl.

In the above definitions for $R_1$, $R_2$, $R_3$ and $R_4$, the term "alkyl" and the alkyl portion of alkoxy are meant to include 1 to 6 carbon atoms. For example, they include groups such as methyl, ethyl, propyl, isopropyl and the like. The acyl portion of the term "alkoxy" is meant to be the residue derived from a lower alkanoic acid, e.g., acetic, propionic or benzoic acid. The term "aralkyl" means an aromatic radical such as phenyl substituted by one or more lower alkyl groups typically phenethyl and the like.

The compounds of this invention exhibit skeletal muscle relaxing activity in several mammalian species. For example, at a dose of 100 mg.–200 mg./kg., these compounds were observed to produce skeletal muscle relaxation with central nervous system depression in laboratory animals such as rats, mice and the like.

These compounds are indicated in providing symptomatic relief in conditions such as anxiety. The dosage would be from 100 mg.–200 mg./kg. of body weight. This dosage regimen may be varied depending upon the condition, weight, species and sex of the mammal being treated by methods well known to the healing arts.

In order to use these compounds, they are formulated into dosage forms such as tablets by combining with standard pharmaceutical diluents such as lactose, mannitol and compounded into these dosage forms suitable for oral administration by methods well known to the pharmacist's art. They are also formulated with sterile vehicles such as water for injection into dosage forms suitable for intramuscular administration. In these dosage forms, the active ingredient is present from about 10–200 mg. per dosage unit.

Generally speaking, the novel compounds of this invention are produced by utilizing the teachings of co-pending application Ser. No. 848,745, filed Aug. 8, 1969 for the production of hydrobenzofuro[3,2-c]indoles and involves first the preparation of 2-hydroxynitrostyrenes, such as 2-hydroxy-3-methoxynitrostyrene [re: L. B. Gairaud and G. R. Lappin, J. Org. Chem., 18, 1 (1953)], having the formula:

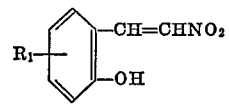

wherein $R_1$ has previous meaning.

The above nitrostyrenes are reacted with dialkanone enamines; as for example, the morpholine-diethylketone enamine [re: R. Jacquier, et al., Bull. de la Soc. Chem. de France, 9, 2845 (1966)], having the formula:

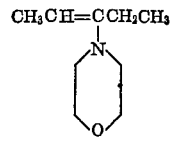

in a solvent, preferably dioxane, at elevated temperatures, preferably 50–110°, for 1–6 hours to give the novel benzopyran intermediates, such as 2-ethyl-3,4-dihydro-8-methoxy-3-methyl-2-morpholine-4-(nitromethyl)-2H-1-benzopyrans, having the formula:

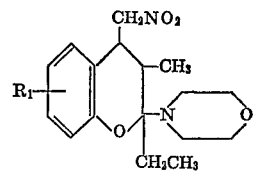

wherein $R_1$ has the previous meaning. Thus, the generic type is similarly obtained by varying the enamine employed.

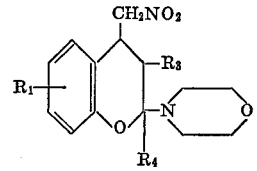

The preparation of novel intermediate nitrones, such as 2-ethyl-4-(2-hydroxy-3-methoxyphenyl)-3-methyl-1-pyrroline 1-oxide, having the formula:

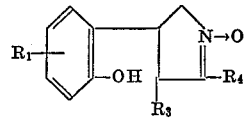

involves a zinc-ammonium chloride reduction of the above nitro compound.

The production of the novel compounds of this invention involves the cyclization of the above nitrones at elevated temperatures, preferably boiling xylene, with the loss of water to give the cyclized product, such as 3-ethyl-3a,8b-dihydro-5-methoxy-3a-methyl-1H-benzofuro[2,3-c]-pyrrole, having the formula:

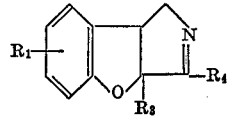

wherein $R_1$, $R_3$ and $R_4$ have previous meanings. This is reduced catalytically in an acid medium, preferably ethanol-acetic acid, to give the novel compounds of this invention, having the formula:

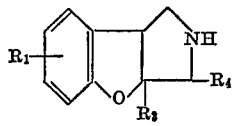

wherein $R_1$, $R_3$ and $R_4$ have previous meanings.

The above tricyclic imines can be transformed also into further novel compounds by reacting with methyl halides to give compounds having the formula:

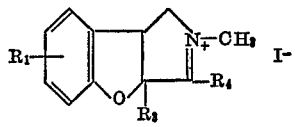

wherein $R_1$, $R_3$ and $R_4$ have previous meanings.

The above quaternary salts can be transformed into further novel and useful compounds having the formula:

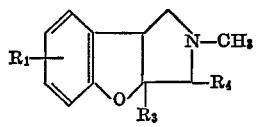

wherein $R_1$, $R_3$ and $R_4$ have previous meanings.

The novel compounds of this invention, having the formula:

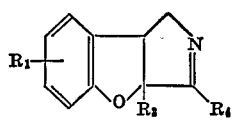

wherein $R_1$=alkoxy and $R_3$ and $R_4$ have previous meanings that can be transformed into further novel and useful compounds having the same formula, however, wherein $R_1$=hydroxy, by reacting with a dealkylating agent, preferably 48% hydrobromic acid at reflux. The above compounds ($R_1$=hydroxy) may be transformed into further novel compounds having the formula:

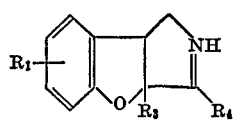

wherein $R_1$=hydroxy, $R_3$ and $R_4$ have previous menaings, by catalytic reduction in an acid medium, preferably ethanol-acetic acid.

In order to further illustrate the practice of this invention, the following examples are included:

EXAMPLE 1

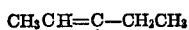

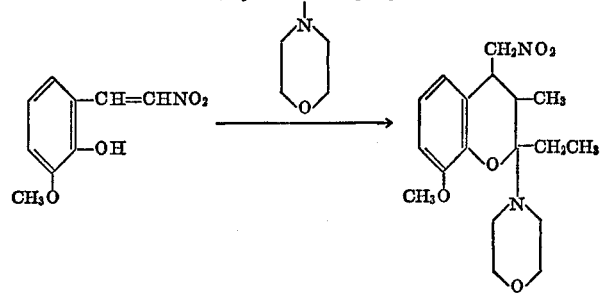

2-ethyl-3,4-dihydro-8-methoxy-3-methyl-2-morpholino-4-(nitromethyl)-2H-1-benzopyran A quantity of 10.0 g. (0.0645 mole) of diethylketone-morpholine enamine was added to a solution of 2-hydroxy-3-methoxy nitrostyrene in 80 ml. of dioxane. After one hour, the separated crystals were filtered and washed with dioxane and petroleum ether. Wt. 10.5 g. (50%); M.P. 176–178° C. Recrystallization from tetrahydrofuran-petroleum ether gave pure white crystals melting at 176–178° C.

Analysis.—Calcd. for $C_{18}H_{26}N_2O_5$ (percent): C, 61.70; H, 7.48; N, 8.00. Found (percent): C, 61.81; H, 7.46; N, 7.91.

EXAMPLE 2

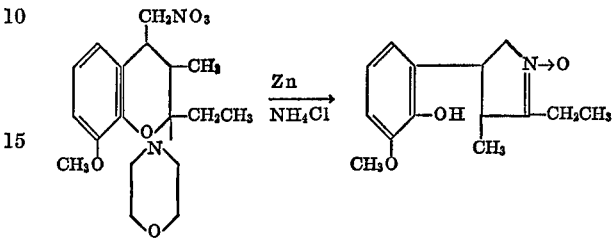

2-ethyl-4-(2-hydroxy-3-methoxyphenyl)-3-methyl-1-pyrroline 1-oxide

A solution of 5.4 g. of ammonium chloride in 150 ml. of water was added to a warm solution (35° C.) of 2-ethyl-3,4-dihydro-8-methoxy-3-methyl - 2 - morpholino-4-(nitromethyl)-2H-1-benzopyran in 750 ml. of tetrahydrofuran. The vigorously stirred mixture was treated with 70 g. of zinc powder over the next several minutes. In 15 minutes, the zinc paste developed into a suspended solid. After one-half an hour the solids were filtered. The filtrate was treated with 250 ml. of 1 N hydrochloric acid and then, after 15 minutes was treated with solid potassium carbonate to neutralize and then to saturate the aqueous layer. The organic layer was separated, dried over anhydrous potassium carbonate, filtered and concentrated. The viscous residue was dissolved in 500 ml. of warm ethyl acetate and petroleum ether was added until definitely turbid. The separated crystals were filtered and washed with petroleum ether. Wt. 20.5 g. (82.3%), M.P. 101–103° C. Recrystallization from ethylacetate gave constant melting white crystals, M.P. 107–109° C. The structure was verified by IR and NMR.

Analysis.—Calcd. for $C_{14}H_{19}NO_3$ (percent): C, 67.44; H, 7.68; N, 5.62. Found (percent): C, 66.75; H, 7.64; N, 5.32.

EXAMPLE 3

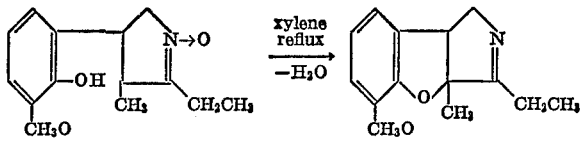

3-ethyl-3a,8b-dihydro-5-methoxy-3a-methyl-1H-benzofuro[2,3-c]-pyrrole hydrochloride A solution of 10.0 g. (0.04 mole) of 2-ethyl-4-(2-hydroxy-3-methoxyphenyl)-3-methyl-1-pyrroline 1-oxide in 150 ml. of xylene was maintained at reflux under nitrogen for 45 minutes. The calculated amount of water was evolved after 15 minutes. Ether (150 ml.) was added to the cooled solution and it was washed with 100 ml. of 1 N sodium hydroxide and then 100 ml. of water. The product was extracted into 100 ml. of 1 N hydrochloric acid. The aqueous phase was charcoaled, filtered, basified with 10 M potassium hydroxide and the separated oil was extracted into 300 ml. of ether. The organic phase was dried over anhydrous potassium carbonate, filtered and treated with hydrogen chloride gas until complete precipitation of the tacky salt. The fully crystallized salt was filtered and washed with ether. Wt. 8.2 g. (76.7%) M.P. 193–195° C. Recrystallization from ethanol-ether gave pure white crystals melting at 193–195° C.

Analysis.—Calcd. for $C_{14}H_{17}NO_2 \cdot HCl$ (percent): H, 62.80; H, 6.78; N, 5.23. Found (percent): C, 62.50; H, 6.81; N, 5.09.

EXAMPLE 4

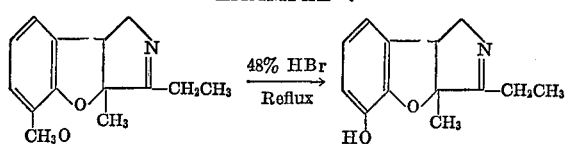

3-ethyl-3a,8b-dihydro-3a-methyl-1H-benzofuro[2,3-c]pyrrol-5-ol

A solution of 5.0 g. (0.019 mole) of 3-ethyl-3a,8b-dihydro-5-methoxy-3a - methyl-1H-benzofuro[2,3-c]pyrrole hydrochloride in 30 ml. of 48% hydrobromic acid was maintained at reflux under nitrogen for 15 minutes. Ice chips in water (ca. 50 g.) were added and the solution was basified with ammonium hydroxide. The separated tacky material that gradually crystallized was filtered, washed well with water and dried. Wt. 3.9 g. (96.2%), M.P. 169–172° C. Recrystallization from ethyl acetate afforded pure pale pink-tan crystals melting at 171–173° C.

*Analysis.*—Calcd. for $C_{13}H_{15}NO_2$ (percent): C, 71.86; H, 6.96; N, 6.45. Found (percent): C, 72.15; H, 6.91; N, 6.25.

EXAMPLE 5

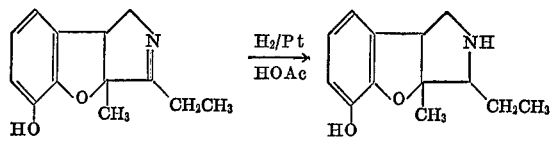

3-ethyl-2,3,3a,8b-tetrahydro-3a-methyl-1H-benzofuro[2,3-c]pyrrol-5-ol

A solution of 2.0 g. (0.009 mole) of 3-ethyl-3a,8b-dihydro-3a-methyl-1H-benzofuro[2,3-c]pyrrol-5-ol in 150 ml. of absolute ethanol and 3 ml. of glacial acetic acid was hydrogenated in a Paar apparatus with 250 mg. platinum oxide until the uptake of hydrogen ceased (ca. 3 hours). The catalyst was filtered and the filtrate concentrated. Water was added and the solution was basified with ammonium hydroxide to precipitate the product. Wt. 1.9 g. (94.6%); M.P. 239–241° C. Recrystallization from hot tetrahydrofuran afforded pure white crystals melting at 239–241° C.

*Analysis.*—Calcd. for $C_{13}H_{17}NO_2$ (percent): C, 71.20; H, 7.82; N, 6.39. Found (percent): C, 71.38; H, 7.73; N, 6.36.

EXAMPLE 6

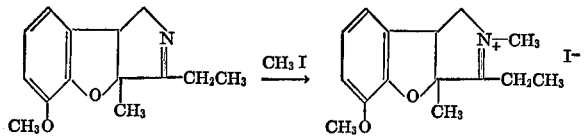

3-ethyl-3a,8b-dihydro-5-methoxy-2,3a-dimethyl-1H-[2,3-c]-pyrrolium iodide

A quantity of 55.4 g. (0.24 mole) of 3-ethyl-3a,8b-dihydro - 5 - methoxy - 3a-methyl-1H-benzofuro[2,3-c]pyrrole base was dissolved in 300 ml. of methyliodide. The quaternary salt began to separate. The mixture was maintained at reflux for 3 hours. Ether (200 ml.) was added and the mixture was filtered and the cake washed with ether. Wt. 61 g. (67.9%); M.P. 154–157° C. Recrystallization from ethanol-ether afforded pure product melting at 169–171° C.

*Analysis.*—Calcd. for $C_{14}H_{17}NO_2 \cdot CH_3I$ (percent): C, 48.27; H, 5.40; N, 3.75. Found (percent): C, 48.21; H, 5.53; N, 4.01.

EXAMPLE 7

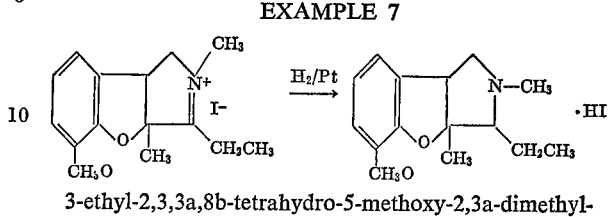

3-ethyl-2,3,3a,8b-tetrahydro-5-methoxy-2,3a-dimethyl-1H-benzofuro[2,3-c]pyrrole hydroiodide A solution of 11.2 g. (0.03 mole) of 3-ethyl-3a,8b-dihydro-5-methoxy - 2,3a - dimethyl-1H-benzofuro[2,3-c]pyrrolium iodide in 250 ml. of absolute ethanol was hydrogenated in a Paar apparatus with platinum oxide until uptake of hydrogen ceased (4 hrs.). The catalyst was filtered and the filtrate was concentrated to ca. 50 ml. volume. Upon addition of ether, yellow crystals separated. Wt. 10.2 g. (90.8%); M.P. 213–215° C. Recrystallization from ethanol afforded pure white product melting at 215–217° C.

*Analysis.*—Calcd. For $C_{15}H_{21}NO_2 \cdot HI$ (percent): C, 48.01; H, 5.91; N, 3.73. Found (percent): C, 48.23; H, 6.12; N, 3.55.

We claim:
1. A compound of the formula:

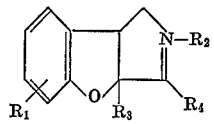

wherein $R_1$ is hydrogen, hydroxy, alkoxy having 1 to 6 carbon atoms in the alkyl portion; $R_2$ is hydrogen, alkyl of 1 to 6 carbon atoms, or non-existent or $CH_3^+I^-$ (when double bond is between the positions indicated); and $R_3$ and $R_4$ are each alkyl of 1 to 6 carbon atoms.

2. A compound according to claim 1 which is 3-ethyl-3a,8b - dihydro - 5 - methoxy-3a-methyl-1H-benzofuro-[2,3-c]-pyrrole hydrochloride.

3. A compound according to claim 1 which is 3-ethyl-3a,8b-dihydro-3a-methyl - 1H - benzofuro[2,3-c]pyrrol-5-ol.

4. A compound according to claim 1 which is 3-ethyl-2,3,3a,8b - tetrahydro - 3a - methyl-1H-benzofuro[2,3-c]pyrrol-5-ol.

5. A compound according to claim 1 which is 3-ethyl-3a,8b-dihydro - 5 - methoxy - 2,3a - dimethyl-1H-benzofuro[2,3-c]-pyrrolium iodide.

6. A compound according to claim 1 which is 3-ethyl-2,3,3a,8b - tetrahydro - 5 - methoxy-2,3a-dimethyl-1H-benzofuro[2,3-c]pyrrole hydroiodide.

References Cited
UNITED STATES PATENTS
3,682,921  8/1972  Hopps et al. _____ 260—268

JOSEPH A. NARCAVAGE, Primary Examiner

U.S. Cl. X.R.

260—247.7 G, 376.3, 376.5 M; 424—274